(12) United States Patent
North et al.

(10) Patent No.: US 10,979,993 B2
(45) Date of Patent: Apr. 13, 2021

(54) AIRCRAFT TIME SYNCHRONIZATION SYSTEM

(71) Applicant: GE AVIATION SYSTEMS LIMITED, Cheltenham (GB)

(72) Inventors: Timothy Robert North, Southampton (GB); Tod Alexander Gilbert, Southampton (GB); Steven Bonnett, Southampton (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 22 days.

(21) Appl. No.: 16/302,791

(22) PCT Filed: May 25, 2017

(86) PCT No.: PCT/EP2017/062711
§ 371 (c)(1),
(2) Date: Nov. 19, 2018

(87) PCT Pub. No.: WO2017/203019
PCT Pub. Date: Nov. 30, 2017

(65) Prior Publication Data
US 2019/0208485 A1    Jul. 4, 2019

(30) Foreign Application Priority Data
May 25, 2016   (GB) ...................................... 1609153

(51) Int. Cl.
*H04W 56/00* (2009.01)
*H04B 7/185* (2006.01)
(Continued)

(52) U.S. Cl.
CPC ...... *H04W 56/005* (2013.01); *H04B 7/18506* (2013.01); *H04L 27/02* (2013.01); *H04W 56/001* (2013.01); *H04W 72/0453* (2013.01)

(58) Field of Classification Search
CPC .. H04B 7/18506; H04L 27/02; H04W 56/001; H04W 56/005; H04W 72/0453
(Continued)

(56) References Cited

U.S. PATENT DOCUMENTS 3,564,544 A    2/1971   Scott et al.
3,705,404 A    12/1972  Chisholm
(Continued)

FOREIGN PATENT DOCUMENTS

EP    1582840 A1    10/2005
EP    1987405 B1    7/2010
(Continued)

OTHER PUBLICATIONS

PCT International Search Report Corresponding to PCT/EP2017/062711 dated Dec. 11, 2017.
(Continued)

*Primary Examiner* — Robert J Lopata
(74) *Attorney, Agent, or Firm* — Dority & Manning, P.A.

(57) ABSTRACT

Systems and methods for providing time reference synchronization for an aircraft are provided. In one embodiment, a method can include receiving, by one or more computing devices associated with a data acquisition system of an aircraft, a signal comprising time synchronization information, wherein the signal comprises a first signal portion and a second signal portion. The method can include filtering, by the one or more computing devices, the signal comprising the time synchronization information to distinguish the first signal portion and the second signal portion from noise associated with the signal. The method can include determining, by the one or more computing devices, the time synchronization information based at least in part on the first signal portion and the second signal portion. The method can include synchronizing, by the one or more computing
(Continued)

devices, a set of data acquired by the data acquisition system with the time synchronization information.

14 Claims, 5 Drawing Sheets

(51) Int. Cl.
    *H04L 27/02*     (2006.01)
    *H04W 72/04*     (2009.01)

(58) Field of Classification Search
    USPC .................................................. 370/329
    See application file for complete search history.

(56) References Cited

U.S. PATENT DOCUMENTS

| | | |
|---|---|---|
| 3,719,920 A | 3/1973 | Grada et al. |
| 3,812,333 A | 5/1974 | Mineck et al. |
| 4,088,899 A | 5/1978 | Miller et al. |
| 4,405,985 A | 9/1983 | Hall et al. |
| 4,534,219 A | 8/1985 | Nadeau et al. |
| 5,144,315 A | 9/1992 | Schwab et al. |
| 5,320,449 A | 6/1994 | Demarteau |
| 5,424,746 A | 6/1995 | Schwab et al. |
| 5,924,056 A | 7/1999 | Boedecker et al. |
| 5,974,862 A | 11/1999 | Lander et al. |
| 6,023,444 A | 2/2000 | Naville et al. |
| 6,122,538 A | 9/2000 | Sliwa, Jr. et al. |
| 6,424,595 B1 | 7/2002 | Chenin |
| 6,765,383 B1 | 7/2004 | Barringer |
| 6,954,137 B2 | 10/2005 | Stewart et al. |
| 7,092,759 B2 | 8/2006 | Nehls et al. |
| 7,127,289 B2 | 10/2006 | Yu et al. |
| 7,139,608 B2 | 11/2006 | Ideker et al. |
| 7,286,872 B2 | 10/2007 | Kramer et al. |
| 7,292,151 B2 | 11/2007 | Ferguson et al. |
| 7,369,896 B2 | 5/2008 | Gesotti |
| 7,519,537 B2 | 4/2009 | Rosenberg |
| 7,558,157 B1 | 7/2009 | Gardner et al. |
| 7,805,020 B2 | 9/2010 | Trudeau et al. |
| 7,847,726 B2 | 12/2010 | Jia et al. |
| 7,847,734 B2 | 12/2010 | Wu |
| 7,855,545 B2 | 12/2010 | Petchenev et al. |
| 7,859,465 B2 | 12/2010 | Wu |
| 7,894,901 B1 | 2/2011 | Koh |
| 7,904,155 B2 | 3/2011 | Yu et al. |
| 7,916,877 B2 | 3/2011 | Goldberg et al. |
| 7,969,819 B2 | 6/2011 | Hall et al. |
| 8,004,933 B2 | 8/2011 | Iseli |
| 8,009,198 B2 | 8/2011 | Alhadef |
| 8,050,881 B1 | 11/2011 | Yeung et al. |
| 8,116,994 B2 | 2/2012 | Parker |
| 8,121,857 B2 | 2/2012 | Galasso et al. |
| 8,130,141 B2 | 3/2012 | Pattabiraman et al. |
| 8,155,121 B2 | 4/2012 | Gudan et al. |
| 8,164,980 B2 | 4/2012 | Sullivan et al. |
| 8,165,844 B2 | 4/2012 | Luinge et al. |
| 8,217,797 B2 | 7/2012 | Ikoyan |
| 8,330,812 B2 | 12/2012 | Maguire, Jr. |
| 8,379,874 B1 | 2/2013 | Simon |
| 8,427,325 B2 | 4/2013 | Ferguson et al. |
| 8,428,088 B2 | 4/2013 | Kroepfl et al. |
| 8,473,176 B2 | 6/2013 | Youngquist et al. |
| 8,512,240 B1 | 8/2013 | Zuckerman-Stark |
| 8,536,436 B2 | 9/2013 | Moreno |
| 8,537,113 B2 | 9/2013 | Weising et al. |
| 8,588,033 B2 | 11/2013 | Pozzo Di Borgo et al. |
| 8,606,071 B2 | 12/2013 | Remennik et al. |
| 8,629,803 B2 | 1/2014 | Pattabiraman et al. |
| 8,643,540 B2 | 2/2014 | Pattabiraman et al. |
| 8,647,287 B2 | 2/2014 | Greenberg et al. |
| 8,744,803 B2 | 6/2014 | Park et al. |
| 8,784,274 B1 | 7/2014 | Chuang |
| 8,792,980 B2 | 7/2014 | Yu et al. |
| 8,810,632 B2 | 8/2014 | Hwang et al. |
| 8,821,015 B2 | 9/2014 | Stagnitto et al. |
| 8,838,646 B2 | 9/2014 | Tang et al. |
| 8,849,387 B2 | 9/2014 | Gilbert et al. |
| 8,966,656 B2 | 2/2015 | Hirsch et al. |
| 8,972,220 B2 | 3/2015 | Park et al. |
| 9,026,151 B2 | 5/2015 | Opshaug et al. |
| 9,042,988 B2 | 5/2015 | DiLorenzo |
| 9,047,773 B2 | 6/2015 | Chen et al. |
| 9,060,682 B2 | 6/2015 | Lokshin |
| 9,070,268 B2 | 6/2015 | Monacos et al. |
| 9,080,438 B1 | 7/2015 | McCoy et al. |
| 9,100,899 B2 | 8/2015 | Meshkati et al. |
| 9,144,055 B2 | 9/2015 | Sun et al. |
| 9,154,917 B2 | 10/2015 | Venkatraman |
| 9,158,644 B2 | 10/2015 | Tang et al. |
| 9,164,167 B2 | 10/2015 | Hyde et al. |
| 9,167,547 B2 | 10/2015 | Suzuki et al. |
| 9,174,838 B2 | 11/2015 | Zhang et al. |
| 9,179,886 B2 | 11/2015 | Stagnitto et al. |
| 9,182,497 B2 | 11/2015 | Geier et al. |
| 9,202,520 B1 | 12/2015 | Tang |
| 9,907,038 B2 * | 2/2018 | Sahlin ................... H04L 5/0048 |
| 2003/0045970 A1 * | 3/2003 | Maryanka .............. H04B 3/542 |
| | | 700/293 |
| 2003/0100406 A1 | 5/2003 | Millington et al. |
| 2003/0105496 A1 | 6/2003 | Yu et al. |
| 2004/0024421 A1 | 2/2004 | Ideker et al. |
| 2004/0088025 A1 | 5/2004 | Gesotti |
| 2004/0105533 A1 | 6/2004 | Iseli |
| 2005/0027320 A1 | 2/2005 | Nehls et al. |
| 2005/0160270 A1 | 7/2005 | Goldberg et al. |
| 2006/0022833 A1 | 2/2006 | Ferguson et al. |
| 2006/0049957 A1 | 3/2006 | Surgenor et al. |
| 2006/0058850 A1 | 3/2006 | Kramer et al. |
| 2006/0161211 A1 | 7/2006 | Thompson et al. |
| 2006/0221187 A1 | 10/2006 | Alhadef |
| 2006/0224188 A1 | 10/2006 | Libbus et al. |
| 2007/0043585 A1 | 2/2007 | Matos |
| 2007/0055315 A1 | 3/2007 | Ideker et al. |
| 2007/0129781 A1 | 6/2007 | Yu et al. |
| 2007/0198139 A1 | 8/2007 | Boran et al. |
| 2007/0247368 A1 | 10/2007 | Wu |
| 2007/0255327 A1 | 11/2007 | Cho et al. |
| 2008/0025640 A1 | 1/2008 | Trudeau et al. |
| 2008/0150797 A1 | 6/2008 | Jia et al. |
| 2008/0167693 A1 | 7/2008 | Kieval et al. |
| 2008/0169801 A1 | 7/2008 | Petchenev et al. |
| 2009/0076419 A1 | 3/2009 | Namineni et al. |
| 2009/0228060 A1 | 9/2009 | Libbus et al. |
| 2009/0306839 A1 | 12/2009 | Youngquist et al. |
| 2009/0310571 A1 * | 12/2009 | Matischek .............. H04W 4/70 |
| | | 370/336 |
| 2009/0323880 A1 | 12/2009 | Filer |
| 2009/0327893 A1 | 12/2009 | Terry et al. |
| 2010/0079291 A1 | 4/2010 | Kroll et al. |
| 2010/0091924 A1 | 4/2010 | Wu |
| 2010/0097890 A1 | 4/2010 | Sullivan et al. |
| 2010/0103878 A1 | 4/2010 | Fuliwara et al. |
| 2010/0132536 A1 | 6/2010 | O'Dwyer |
| 2010/0222836 A1 | 9/2010 | Jarverud |
| 2010/0223128 A1 | 9/2010 | Dukellis et al. |
| 2010/0250986 A1 | 9/2010 | Black et al. |
| 2011/0015804 A1 | 1/2011 | Cluff et al. |
| 2011/0063114 A1 | 3/2011 | Ikoyan |
| 2011/0093031 A1 | 4/2011 | Yu et al. |
| 2011/0109726 A1 | 5/2011 | Hwang et al. |
| 2011/0112739 A1 | 5/2011 | O'Dea et al. |
| 2011/0184319 A1 | 7/2011 | Mack et al. |
| 2011/0216002 A1 | 9/2011 | Weising et al. |
| 2011/0228091 A1 | 9/2011 | Kroepfl et al. |
| 2012/0020445 A1 | 1/2012 | DiStasi et al. |
| 2012/0021758 A1 | 1/2012 | Gum et al. |
| 2012/0042257 A1 | 2/2012 | Aftab et al. |
| 2012/0124088 A1 | 5/2012 | Meshkati et al. |
| 2012/0230473 A1 | 9/2012 | Stagnitto et al. |
| 2012/0245476 A1 | 9/2012 | Skerl et al. |
| 2012/0262297 A1 | 10/2012 | Poon |
| 2012/0307145 A1 | 12/2012 | Buchheit |

(56) References Cited

U.S. PATENT DOCUMENTS

| | | | |
|---|---|---|---|
| 2013/0010812 A1* | 1/2013 | Carro | G07C 5/085 370/503 |
| 2013/0038520 A1 | 2/2013 | Osman | |
| 2013/0072145 A1 | 3/2013 | Dantu | |
| 2013/0102324 A1 | 4/2013 | Qiu et al. | |
| 2013/0103943 A1 | 4/2013 | Hirsch et al. | |
| 2013/0106697 A1 | 5/2013 | Kulik | |
| 2013/0120188 A1 | 5/2013 | Pattabiraman et al. | |
| 2013/0124763 A1* | 5/2013 | Kessler | H04L 12/403 710/110 |
| 2013/0138266 A1* | 5/2013 | Koike | A63H 30/04 701/2 |
| 2013/0142016 A1 | 6/2013 | Pozzo DiBorgo et al. | |
| 2013/0154854 A1 | 6/2013 | Chen et al. | |
| 2013/0198276 A1 | 8/2013 | Leppänen et al. | |
| 2013/0219207 A1 | 8/2013 | Milota et al. | |
| 2013/0234885 A1 | 9/2013 | Geier et al. | |
| 2013/0310660 A1 | 11/2013 | Zuckerman-Stark et al. | |
| 2014/0012143 A1 | 1/2014 | Gilbert et al. | |
| 2014/0039804 A1 | 2/2014 | Park et al. | |
| 2014/0047231 A1 | 2/2014 | Cummings et al. | |
| 2014/0052401 A1 | 2/2014 | Riley et al. | |
| 2014/0053260 A1 | 2/2014 | Gupta et al. | |
| 2014/0070944 A1 | 3/2014 | Lacaze et al. | |
| 2014/0086219 A1 | 3/2014 | Suzuki et al. | |
| 2014/0105054 A1 | 4/2014 | Saegrov et al. | |
| 2014/0118143 A1 | 5/2014 | Monacos et al. | |
| 2014/0120838 A1 | 5/2014 | Lokshin | |
| 2014/0122958 A1 | 5/2014 | Greenebrg et al. | |
| 2014/0125499 A1 | 5/2014 | Cate et al. | |
| 2014/0168243 A1 | 6/2014 | Huang | |
| 2014/0181650 A1 | 6/2014 | Polubinski | |
| 2014/0192793 A1 | 7/2014 | Abraham et al. | |
| 2014/0236493 A1 | 8/2014 | Park et al. | |
| 2014/0236531 A1 | 8/2014 | Carter | |
| 2014/0241441 A1 | 8/2014 | Devaucelle | |
| 2014/0257624 A1 | 9/2014 | Safa-Bakhsh et al. | |
| 2014/0274161 A1 | 9/2014 | Venkatramon et al. | |
| 2014/0288620 A1 | 9/2014 | DiLorenzo | |
| 2014/0310643 A1 | 10/2014 | Karmanenko et al. | |
| 2014/0317660 A1 | 10/2014 | Cheung et al. | |
| 2014/0333733 A1 | 11/2014 | Kim | |
| 2015/0043568 A1 | 2/2015 | Coulon et al. | |
| 2015/0049863 A1 | 2/2015 | Stagnitto et al. | |
| 2015/0073494 A1 | 3/2015 | Ideker et al. | |
| 2015/0081931 A1 | 3/2015 | Tang et al. | |
| 2015/0094100 A1 | 4/2015 | Opshaug et al. | |
| 2015/0105097 A1 | 4/2015 | Sun et al. | |
| 2015/0112883 A1 | 4/2015 | Orduna et al. | |
| 2015/0116497 A1 | 4/2015 | Doval et al. | |
| 2015/0127268 A1 | 5/2015 | Park et al. | |
| 2015/0179044 A1 | 6/2015 | Wu et al. | |
| 2015/0185315 A1 | 7/2015 | Hyde et al. | |
| 2015/0223767 A1 | 8/2015 | Sehnert et al. | |
| 2015/0246711 A1 | 9/2015 | Lee | |
| 2015/0253351 A1 | 9/2015 | Sadasivam et al. | |
| 2015/0262497 A1 | 9/2015 | Landau et al. | |
| 2015/0271772 A1 | 9/2015 | Knowles | |
| 2015/0285593 A1 | 10/2015 | Dribben | |
| 2015/0300907 A1 | 10/2015 | Giunta et al. | |
| 2015/0308257 A1 | 10/2015 | McCoy et al. | |
| 2015/0317801 A1 | 11/2015 | Bentley et al. | |
| 2015/0341875 A1* | 11/2015 | Kwak | H04W 56/001 370/350 |
| 2015/0358933 A1 | 12/2015 | Yamamoto et al. | |
| 2015/0359457 A1 | 12/2015 | Blumenthal et al. | |
| 2015/0365224 A1* | 12/2015 | Waheed | H04B 3/542 370/509 |
| 2016/0005230 A1 | 1/2016 | Asselin et al. | |
| 2016/0045161 A1 | 2/2016 | Alshaer et al. | |
| 2016/0103162 A1 | 4/2016 | Safa-Bakhsh et al. | |
| 2016/0352388 A1* | 12/2016 | Lane | H04L 7/08 |
| 2016/0380671 A1* | 12/2016 | Jackson | H04L 27/0012 455/114.3 |
| 2017/0251508 A1* | 8/2017 | Park | H04W 4/46 |
| 2019/0028309 A1* | 1/2019 | Noda | G01S 1/00 |

FOREIGN PATENT DOCUMENTS

| | | |
|---|---|---|
| EP | 1660178 B1 | 1/2011 |
| EP | 2433866 A2 | 3/2012 |
| EP | 2533439 A2 | 12/2012 |
| EP | 2541853 A1 | 1/2013 |
| EP | 2752642 A1 | 7/2014 |
| EP | 2775454 A1 | 9/2014 |
| EP | 2540215 B1 | 11/2015 |
| EP | 2942688 A1 | 11/2015 |
| GB | 2518921 A | 4/2015 |
| WO | WO97/42560 A1 | 11/1997 |
| WO | WO03/093950 A2 | 11/2003 |
| WO | WO2006/014810 A2 | 2/2006 |
| WO | WO2007/084850 A2 | 7/2007 |
| WO | WO2009/116032 A2 | 9/2009 |
| WO | WO2010/036488 A1 | 4/2010 |
| WO | WO2010/045539 A2 | 4/2010 |
| WO | WO2010/119084 A1 | 10/2010 |
| WO | WO2011/091347 A2 | 7/2011 |
| WO | WO2011/091355 A1 | 7/2011 |
| WO | WO2011/129907 A1 | 10/2011 |
| WO | WO2013/006210 A1 | 1/2013 |
| WO | WO2013/032364 A1 | 3/2013 |
| WO | WO2013/059989 A1 | 5/2013 |
| WO | WO2013/154231 A1 | 10/2013 |
| WO | WO2014/116977 A2 | 7/2014 |
| WO | WO2015/089224 A1 | 6/2015 |
| WO | WO2015/109442 A1 | 7/2015 |
| WO | WO2015/117049 A2 | 8/2015 |
| WO | WO2015/140816 A1 | 9/2015 |
| WO | WO20151160964 A1 | 10/2015 |
| WO | WO2015/169474 A1 | 11/2015 |
| WO | WO2015/195728 A1 | 12/2015 |

OTHER PUBLICATIONS

Great Britain Search and Examination Report Corresponding to GB1609153 dated Nov. 24, 2016.

* cited by examiner

AIRCRAFT TIME SYNCHRONIZATION SYSTEM

FIELD

The present subject matter relates generally to time-data synchronization and more particularly to providing time reference synchronization for components of an aircraft.

BACKGROUND

In an aircraft, measurement systems typically include multiple devices distributed throughout the aircraft to observe various aircraft operations. These measurement systems often need to be accurately synchronized in time such that events measured by one device can be communicated to another device. In this way, measurement systems can correlate events measured by spatially separated devices.

Current synchronization solutions can include network time protocol (NTP) and precision time protocol (PTP). However, such protocols can include accuracy limitations and induce high processor loads. While a global position system (GPS) receiver can be used at each device of the measurement system, outfitting such hardware can be costly, as well as, less reliable due to GPS signal unavailability.

BRIEF DESCRIPTION

Aspects and advantages of examples of the present disclosure will be set forth in part in the following description, or may be learned from the description, or may be learned through practice of the examples.

One example aspect of the present disclosure is directed to a computer-implemented method of providing time reference synchronization for an aircraft system. The method can include receiving, by one or more computing devices associated with a data acquisition system of an aircraft, a signal comprising time synchronization information. The signal can include a first signal portion and a second signal portion. The method can further include filtering, by the one or more computing devices, the signal comprising the time synchronization information to distinguish the first signal portion and the second signal portion from noise associated with the signal. The method can include determining, by the one or more computing devices, the time synchronization information based at least in part on the first signal portion and the second signal portion. The method can further include synchronizing, by the one or more computing devices, a set of data acquired by the data acquisition system with the time synchronization information.

Another example aspect of the present disclosure is directed to a computing system for providing a time reference synchronization signal. The system can include one or more processors and one or more memory devices included in an aircraft. The one or more memory devices can store instructions that when executed by the one or more processors cause the one or more processors to perform operations. The operations can include encoding a signal with time synchronization information in at least one of a preamble portion, a time reference portion, a post-amble portion, and a time synchronization portion. The operations can further include sending the signal with the time synchronization information to one or more data acquisition systems. The one or more data acquisition systems can be configured to determine the time synchronization information based at least in part on at least one of the preamble portion, the time reference portion, the post-amble portion, and the time synchronization portion.

Yet another example aspect of the present disclosure is directed to an aircraft. The aircraft can include a computing system. The computing system can be configured to encode a signal with time synchronization information. The signal can include a preamble portion, a time reference portion, a post-amble portion, and a time synchronization portion. The computing system can be further configured to send the signal with the time synchronization information. The aircraft can include a data acquisition system. The data acquisition system can be configured to receive the signal comprising the time synchronization information. The data acquisition system can be further configured to verify that the signal is encoded with the time synchronization information based at least in part on at least one of the preamble portion, the time reference portion, and the post-amble portion. The data acquisition system can be configured to identify the time synchronization information based at least in part on the time synchronization portion. The data acquisition system can be further configured to synchronize a set of data acquired by the data acquisition system with the time synchronization information.

Other example aspects of the present disclosure are directed to systems, methods, aircrafts, avionics systems, devices, and non-transitory computer-readable media for providing time reference synchronization.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate examples of the present disclosure and, together with the description, serve to explain the related principles.

BRIEF DESCRIPTION OF THE DRAWINGS

Detailed discussion of examples directed to one of ordinary skill in the art are set forth in the specification, which makes reference to the appended figures, in which.

DETAILED DESCRIPTION

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods of providing time reference synchronization for an aircraft system. For instance, an aircraft can include a master clock computing system and one or more data acquisition system(s) (e.g., accelerometer, tachometer) associated with a component (e.g., engine) of the aircraft. The master clock computing system can encode a specialized, unique signal with time synchronization information (e.g., a reference time, local time). The master clock computing system can send the signal to the data acquisition system(s). For example, the master clock computing system can send the signal via one or more power line(s) of the aircraft to leverage the existing aircraft hardware and avoid adding extra cable The data acquisition system(s) can receive the signal including the time synchronization information, for example, via the power line(s) and filter the signal from noise. The data acquisition system(s) can verify that the signal is a signal-of-interest by examining, at least a first portion of, the signal. The data acquisition system(s) can identify and extract the time synchronization information based, at least in part, on another portion of the signal. The data acquisition system(s) can synchronize a set of data associated with a component of the aircraft with the time synchronization information and send the synchronized data to another computing system (e.g., ground-based system, data repository). In this way, the data acquisition systems can use time synchronization information from a centralized master clock computing system to measure local events, thereby achieving highly accurate time referencing, without needing a real clock on each of the individual data acquisition system(s).

More particularly, the master clock computing system can encode a signal with time synchronization information to create the specialized signal. For instance, the signal can include a carrier wave, such as a high frequency carrier wave. The signal can include a first portion and a second portion. The first signal portion can include at least one of a preamble portion, a time reference portion, and/or a post-amble portion, each including one or more signal cycle(s). The second signal portion can include a time synchronization portion, which can include one or more pulse(s). In some implementations, at least one cycle and/or pulse can be amplitude shift keyed.

The master clock computing system can send the signal (with the time synchronization information) to one or more data acquisition system(s). For example, the master clock computing system can modulate the one or more power line(s) associated with the data acquisition system(s) with the signal (e.g., including the carrier wave). In this way, the time synchronization information can be provided to the data acquisition system(s) using power lines already existing in the aircraft, without adding additional cables to the aircraft for time synchronization. The data acquisition system(s) can receive the signal, including the time synchronization information. For example, the power line(s) can be configured to feed the signal to the data acquisition system(s) (e.g., a channel, a sensor ADC, etc. associated therewith), which can sample the signal at a multiple of the carrier frequency.

The data acquisition system(s) can determine the time synchronization information by processing one or more individual portion(s) of the signal. To do so, the computing device(s) can verify the signal and identify the time synchronization information of the signal. For instance, as indicated above, the first portion of the signal can include, at least one of, a preamble portion, a time reference portion, and/or a post-amble portion. The data acquisition system(s) can verify that the signal is a specialized, unique signal from the master clock computing system by examining the preamble portion, the time reference portion, and/or the post-amble portion and its associated structure/cycle(s). For example, the data acquisition system(s) can compare the structure/cycle(s) included in those portions to one or more threshold(s) that are indicative of whether the signal includes the time synchronization information. If the signal structure/cycle(s) are above the threshold, then the signal can be accepted. In this way, the first signal portion can indicate to the data acquisition system(s) that a specialized time synchronization signal is being sent to the data acquisition system(s). However, if the structure/cycle(s) are below the threshold, the data acquisition system can reject the signal (e.g., as error-ridden, corrupt, lacking time synchronization information).

The data acquisition system(s) can identify and extract the time synchronization information of the signal based, at least in part, on the second portion of the signal. More specifically, in some implementations, the data acquisition system(s) can identify the time synchronization information based, at least in part, on the time synchronization portion, including one or more time synchronization pulse(s). For example, the data acquisition system(s) can identify a local zero crossing associated with one or more of the time synchronization pulse(s) to identify the time synchronization information (e.g., a reference time, local time), as further described herein. The data acquisition system(s) can synchronize a set of data acquired by the data acquisition system(s) (e.g., associated with an engine component, auxiliary power unit) with the time synchronization information. Moreover, the data acquisition system(s) can send a message including the time synchronized data to another computing system (e.g., ground-based data center).

The systems and methods according to example aspects of the present disclosure provide an efficient, cost-effective approach for providing accurate time references for acquired data. Particularly, systems and methods can provide simplified time synchronization information by leveraging the existing aircraft hardware. Replicated electronics across the systems can lead to similar delays for each data acquisition system, which can be easily predicted and compensated for during synchronization and/or analysis. Moreover, the systems and methods employ simple software decoding of the time synchronization information to incur very little processor load. In this way, the systems and methods according to example aspects of the present disclosure have a technical effect of producing simple, highly accurate time synchronization using existing aircraft hardware, which can limit the bandwidth expended on time synchronization.

Figure 1:
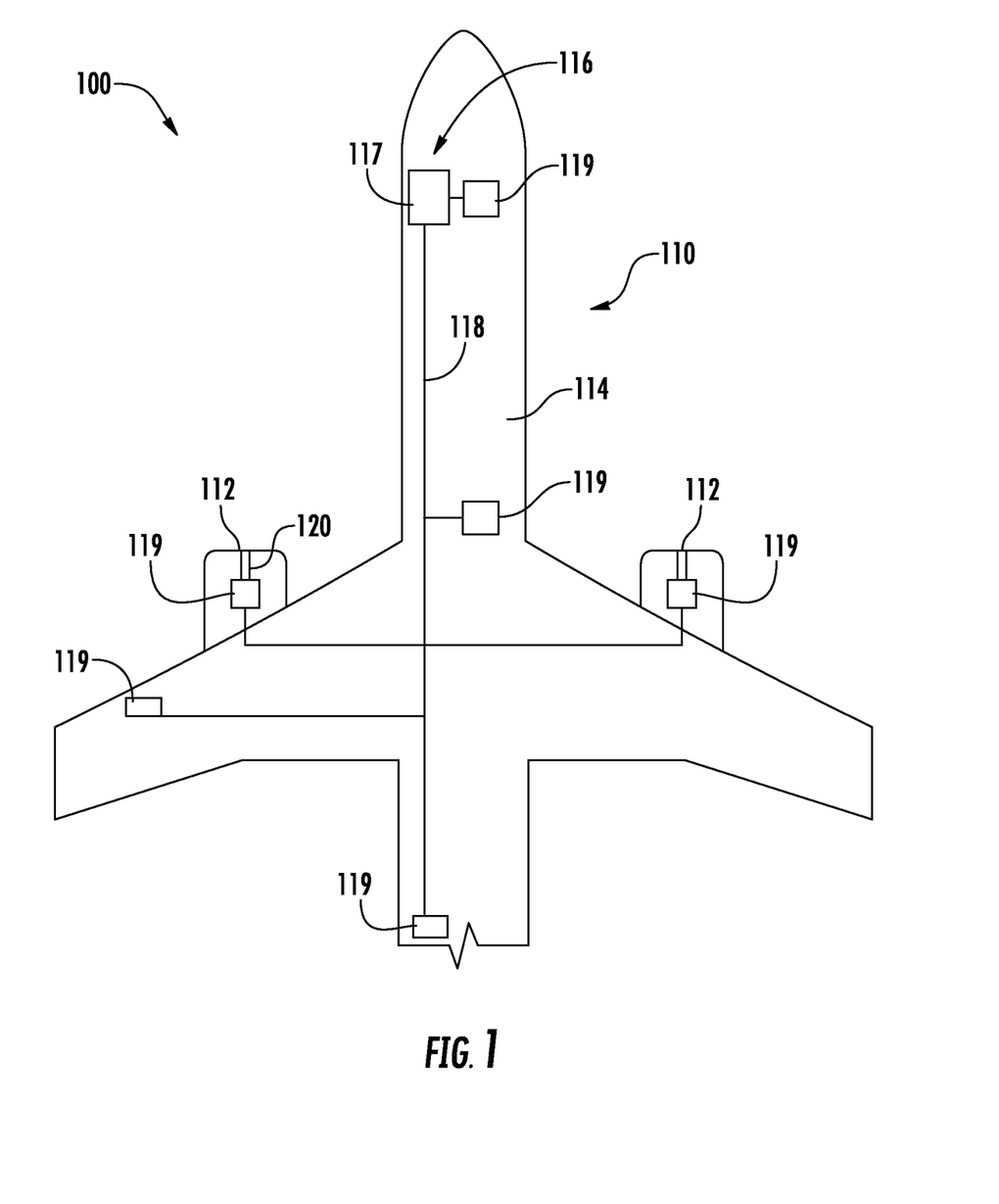
FIG. 1 depicts an example system according to examples of the present disclosure.

FIG. 1 depicts an example system 100 according to example embodiments of the present disclosure. As shown, the system 100 can include an aircraft 110 having one or more engine(s) 112, a fuselage 114, a master clock computing system 116, and one or more data acquisition system(s) 119.

As shown in FIG. 1, the computing system 116 can include one or more computing device(s) 117 that can be associated with, for instance, an avionics system. The computing device(s) 117 can include various components for performing various operations and functions. For example, and as further described herein, the computing device(s) 117 can include one or more processor(s) and one or more memory device(s). The one or more memory device(s) can store instructions that when executed by the one or more processor(s) cause the one or more processor(s) to perform the operations and functions, for example, as those described herein for providing a time reference synchronization signal.

The computing device(s) 117 can be coupled to a variety of systems included on the aircraft 110. For instance, the computing device(s) 117 can be coupled to the data acquisition system(s) 119 via one or more power line(s) 118 associated with the data acquisition(s) 119. The power line(s) 118 can be those already existing on an aircraft 110. In some implementations, the computing device(s) 117 can be coupled to a variety of systems (including the data acquisition(s) 119) over a network. The network can include a data bus or a combination of wired and/or wireless communication links.

The data acquisition system(s) 119 can be configured to monitor and collect data with respect to one or more components of the aircraft 110. The data acquisition system(s) 119 can include an accelerometer, tachometer, magnetic tachometer, optical tachometer, sensor, and/or any other suitable type of measurement device included on the aircraft 110. By way of example, the data acquisition system(s) 119 can be associated with a component 120 of the engine(s) 112, a component of an auxiliary power unit, etc. The data acquisition system(s) 119 can be configured to measure the vibration experienced by the component 120 of the aircraft 110 (e.g., engine gearbox, rotor, shaft).

Figure 2:
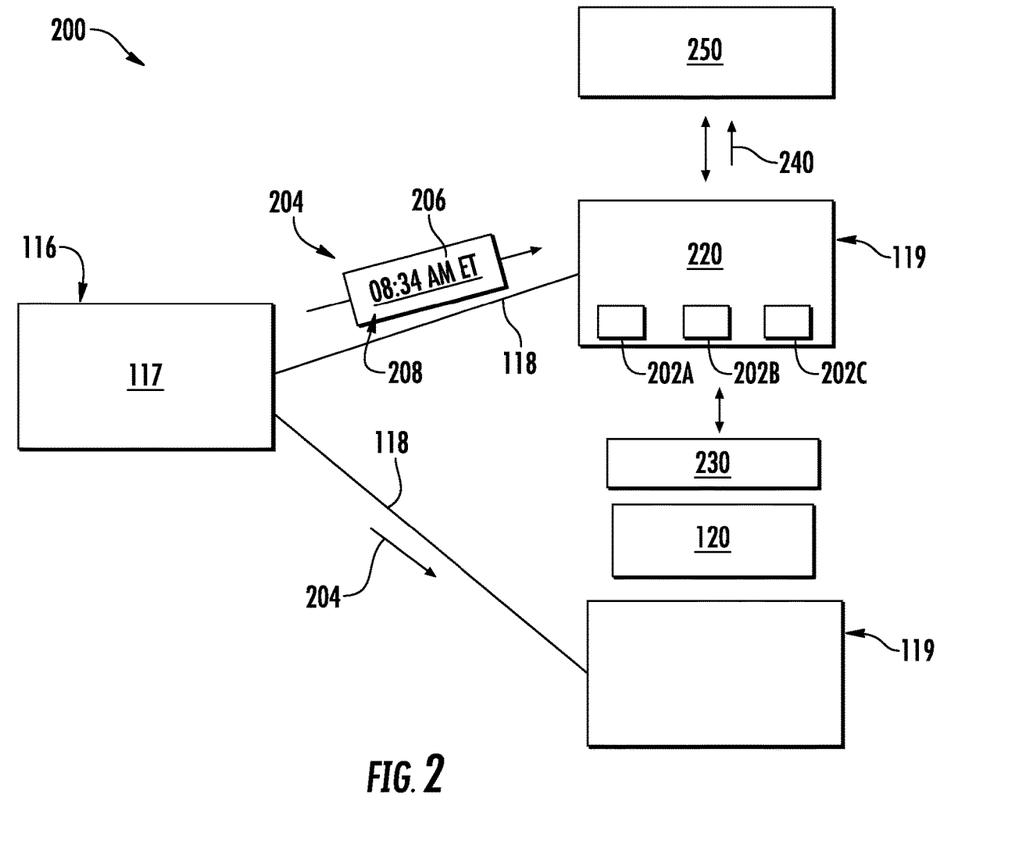
FIG. 2 depicts an example system according to examples of the present disclosure.

FIG. 2 depicts an example system 200 according to example embodiments of the present disclosure. The system 200 can include the computing system 116 and one or more data acquisition system(s) 119, which can include one or more computing device(s) 220, as further described herein. As shown, the computing system 116 can include the computing device(s) 117, which can be coupled to the data acquisition system(s) 119 via one or more power line(s) 118. In some implementations, the data acquisition system(s) 119 can include a plurality of channels 202A-C such as, for instance, channels associated with a multi-channel analog-to-digital converter (ADC). In some implementations, the power line(s) 118 can be coupled to one or more of the channels 202A-C. By way of example, a first channel 202A can be associated with the receipt of a signal including time synchronization information, a second channel 202B can be associated with a tachometer, and/or a third channel 202C can be associated with an accelerometer.

The computing system 116 can be configured to provide a time reference synchronization signal to the data acquisition system(s) 119. The computing device(s) 117 can be configured to send a signal 204, including time synchronization information 206 to the data acquisition system(s) 119. In some implementations, the computing device(s) 117 can be configured to send the signal 204 via one or more of the power line(s) 118 associated with the data acquisition system(s) 119. The time synchronization information 206 can include data indicative of a local time 208, a reference time, etc. Moreover, the computing device(s) 117 can be configured to encode the signal 204 such that it is a specialized signal that can indicate to the data acquisition system(s) 119 that it contains the time synchronization information 206.

Figure 3:
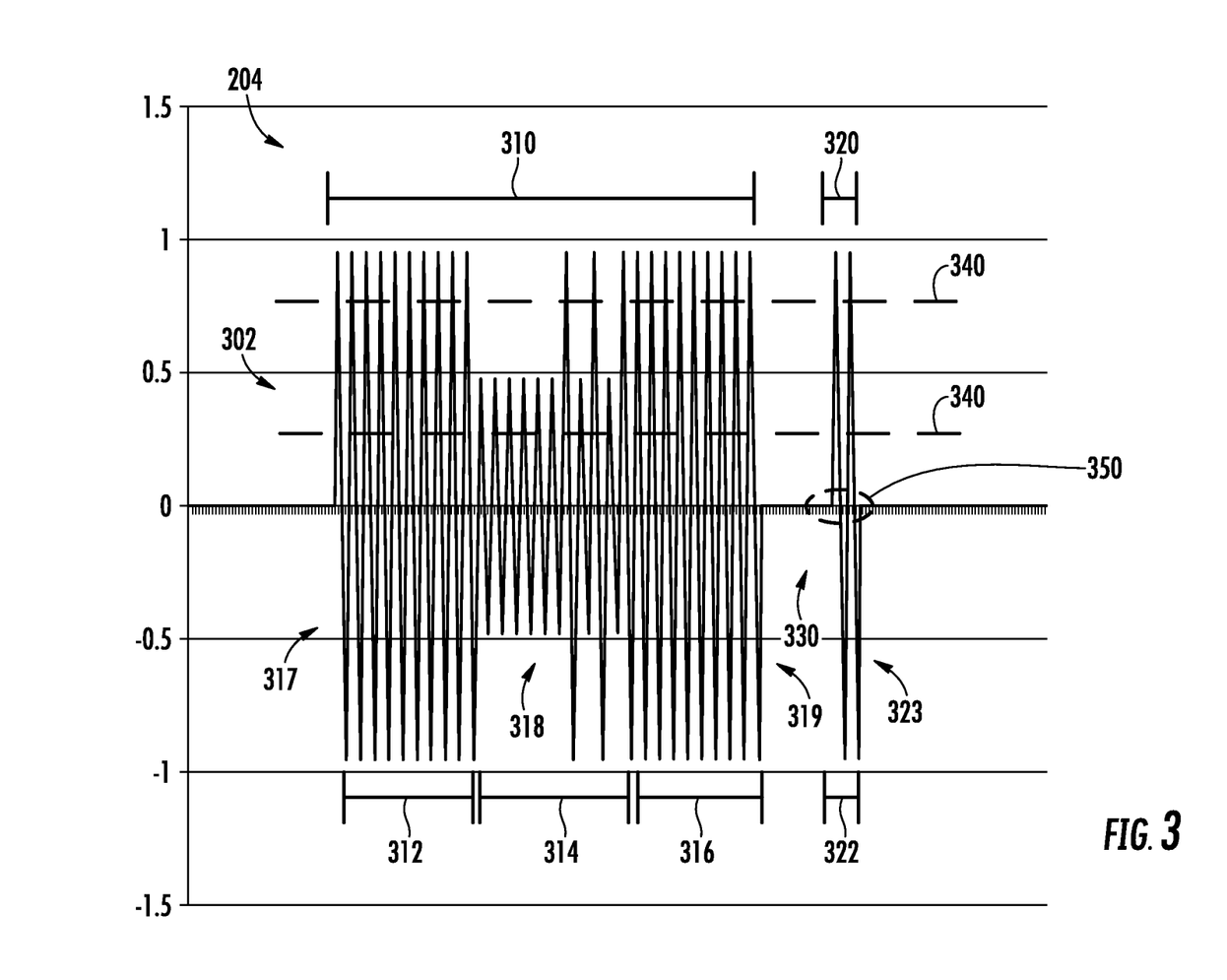
FIG. 3 depicts an example signal according to examples of the present disclosure.

For instance, FIG. 3 depicts an example signal 204 according to example embodiments of the present disclosure. FIG. 3 includes a signal structure that is not intended to be limiting. The signal 204 can include a different structure than the one shown. The signal 204 can include more, less, and/or different portions, cycles, pulses, spaces, etc. than those shown in FIG. 3. Moreover, the portions of signal 204 can be arranged in a different order than that shown in FIG. 3.

In some implementations, the signal 204 can include a carrier wave 302 (e.g., a high frequency carrier wave). At least one cycle of the signal 204 can be amplitude shift keyed (e.g., varying amplitude of the signal 204 to change signal mode/state). The computing device(s) 117 can be configured to encode the signal 204 to include one or more state(s) such as, for example: a space (e.g., indicating no carrier present), a one (e.g., indicating carrier at full amplitude), and/or a zero (e.g., indicating carrier at half amplitude). Moreover, the computing device(s) 117 can be configured to encode the signal 204 to include a first signal portion 310 and/or a second signal portion 320. In some implementations, the signal 204 can include a space 330 (e.g., equivalent to a plurality of bits) between the first portion 310 and the second portion 320. For example, the space 330 can be equivalent to five bits.

The first signal portion 310 can include, at least one of, a preamble portion 312, a time reference portion 314, and/or a post-amble portion 316. The preamble portion can include one or more first signal cycle(s) 317. For instance, the one or more first signal cycle(s) 317 can include a plurality of carrier wave cycles decoded as ones. By way of example, the first signal cycles(s) 317 can include ten carrier wave cycles, as shown in FIG. 3. The time reference portion 314 can include one or more second signal cycle(s) 318. For instance, the one or more second signal cycle(s) 318 can include a multi-bit time reference (e.g., a plurality of carrier waves amplitude keyed shifted). For example, the second cycle(s) 318 can include ten carrier wave cycles (e.g., encoded at full amplitude, half amplitude), as shown in FIG. 3. The post-amble portion 316 can include one or more third signal cycle(s) 319. For instance, the third cycle(s) 319 can include a plurality of carrier wave cycles decoded as ones. The third cycles(s) 319 can include, for example, ten carrier wave cycles, as shown in FIG. 3. The inclusion of the preamble portion 312, the time reference portion 314, and/or the post-amble portion 316 in the signal 204 can create a unique, specialized signal that can be analyzed by the computing device(s) 220 of the data acquisition system(s) 119 to verify that the signal 204 includes time synchronization information 206, as further described herein.

The second portion 320 can include a time synchronization portion 322. The time synchronization portion 322 can include one or more time synchronization pulse(s) 323. For example, the time synchronization pulse(s) 323 can include one or more cycles decoded as ones, as shown in FIG. 3. The second portion 320 (e.g., the time synchronization portion 322) can include the time synchronization information 206. For example, the one or more time synchronization pulse(s) 323 can be encoded with the local time 208. As further described herein, the computing device(s) 220 of the data acquisition system(s) 119 can be configured to process the second portion 320, including the time synchronization portion 322, to identify the time synchronization information 206.

Returning to FIG. 2, the computing device(s) 117 can be configured to encode the signal 204 with the time synchronization information 206, such as in the first portion 310 and/or the second portion 320. Additionally, and/or alternatively, the computing device(s) 117 can be configured to encode the signal 204 with the time synchronization information 206 in at least one of the preamble portion 312, the time reference portion 314, the post-amble portion 316, and/or the time synchronization portion 322.

In some implementations, the computing device(s) 117 can encode the signal 204 such that the computing device(s) 220 of the data acquisition system(s) 119 can verify that the signal 204 includes the time synchronization information 206 and also identify the time synchronization information 206. For example, the one or more first signal cycle(s) 317, the one or more second signal cycle(s) 318, and/or the one or more third signal cycle(s) 319 can be encoded to verify that the signal 204 includes the time synchronization information 206, as further described herein. The one or more time synchronization pulse(s) 323 can be encoded with a local time 208, which can be used for data synchronization.

The computing device(s) 117 can be configured to send the signal 204 with the time synchronization information 206, for example, to one or more computing device(s) 220 of the data acquisition system(s) 119. By way of example, the signal 204 can include a carrier wave 302 (e.g., high frequency carrier wave) and the computing device(s) 117 can be configured to modulate the one or more power line(s) 118 associated with the data acquisition system(s) 119 with the signal 204, including the carrier wave 302. In this way, the time synchronization information 206 can be provided to the data acquisition system(s) 119 using power lines already existing in the aircraft 110, without adding additional cables to the aircraft 110 for time synchronization. Moreover, the signal 204 can be associated with a short burst, which can lead to bandwidth limiting of the signal modulation to have little effect on the time synchronization information 206.

The computing device(s) 220 of the data acquisition system(s) 119 can be configured to receive the signal 204, including the time synchronization information 206. For example, the power line(s) 118 can be configured to feed the signal 204 to the data acquisition system(s) 119 (e.g., a channel 202A-C, a sensor ADC, etc. associated therewith), which can be configured to sample the signal 204 at a multiple of the carrier frequency.

The computing device(s) 220 of the data acquisition system(s) 119 can be configured to analyze the signal 204 to extract the time synchronization information 206. For instance, the computing device(s) 220 of the data acquisition system(s) 119 can be configured to determine the time synchronization information 206 based, at least in part, on the signal 204. In some implementations, this can be done based, at least in part, on at least one of the preamble portion 312, the time reference portion 314, the post-amble portion 316, and/or the time synchronization portion 322.

For example, the computing device(s) 220 of the data acquisition system(s) 119 can be configured to verify that the signal 204 is encoded with time synchronization information 206. In some implementations, this can based, at least in part, on at least one of the preamble portion 312, the time reference portion 314, and/or the post-amble portion 316. More specifically, in some implementations, computing device(s) 220 can be configured to verify that the signal 204 is encoded with time synchronization information 206 based, at least in part, on at least one of the one or more first signal cycle(s) 317, the one or more second signal cycle(s) 318, and/or the one or more third signal cycle(s) 319. For example, and as further described below, the computing device(s) 220 can be configured to compare the particular cycle structure of the first portion 310 with one or more thresholds 340 (shown in FIG. 3) to confirm that the signal 204 includes the time synchronization information 206.

In some implementations, the computing device(s) 220 of the data acquisition system(s) 119 can be configured to identify the time synchronization information 206 based, at least in part, on the second portion 320. More specifically, in some implementations, the computing device(s) 220 can be configured to identify the time synchronization information 206 based, at least in part, on the time synchronization portion 322. For example, the computing device(s) 220 of the data acquisition system(s) 119 can be configured to identify the time synchronization information 206 based, at least in part, on the one or more time synchronization pulse(s) 323, as further described herein.

The computing device(s) 220 of the data acquisition system(s) 119 can be configured to synchronize a set of data 230, acquired by the data acquisition system(s) 119. For example, the data acquisition system(s) 119 can be configured to acquire the set of data 230 associated with one or more component(s) 120 (e.g., of engine 112). The computing device(s) 220 can be configured to synchronize the set of data 230 with the time synchronization information 206. In some implementations, the data acquisition system(s) 119 can be configured to synchronize data acquired from another device and/or data acquisition system 119.

The computing device(s) 220 can be configured to send a message 240, including the set of data 230 acquired by the data acquisition system(s) 119 and synchronized with the time synchronization information 206. The message can be sent to a remote computing system 250 that can be remote from the data acquisition system(s) 119 and/or the aircraft 110. For example, the remote computing system 250 can be associated with a ground-based data analysis system and/or repository.

Figure 4:
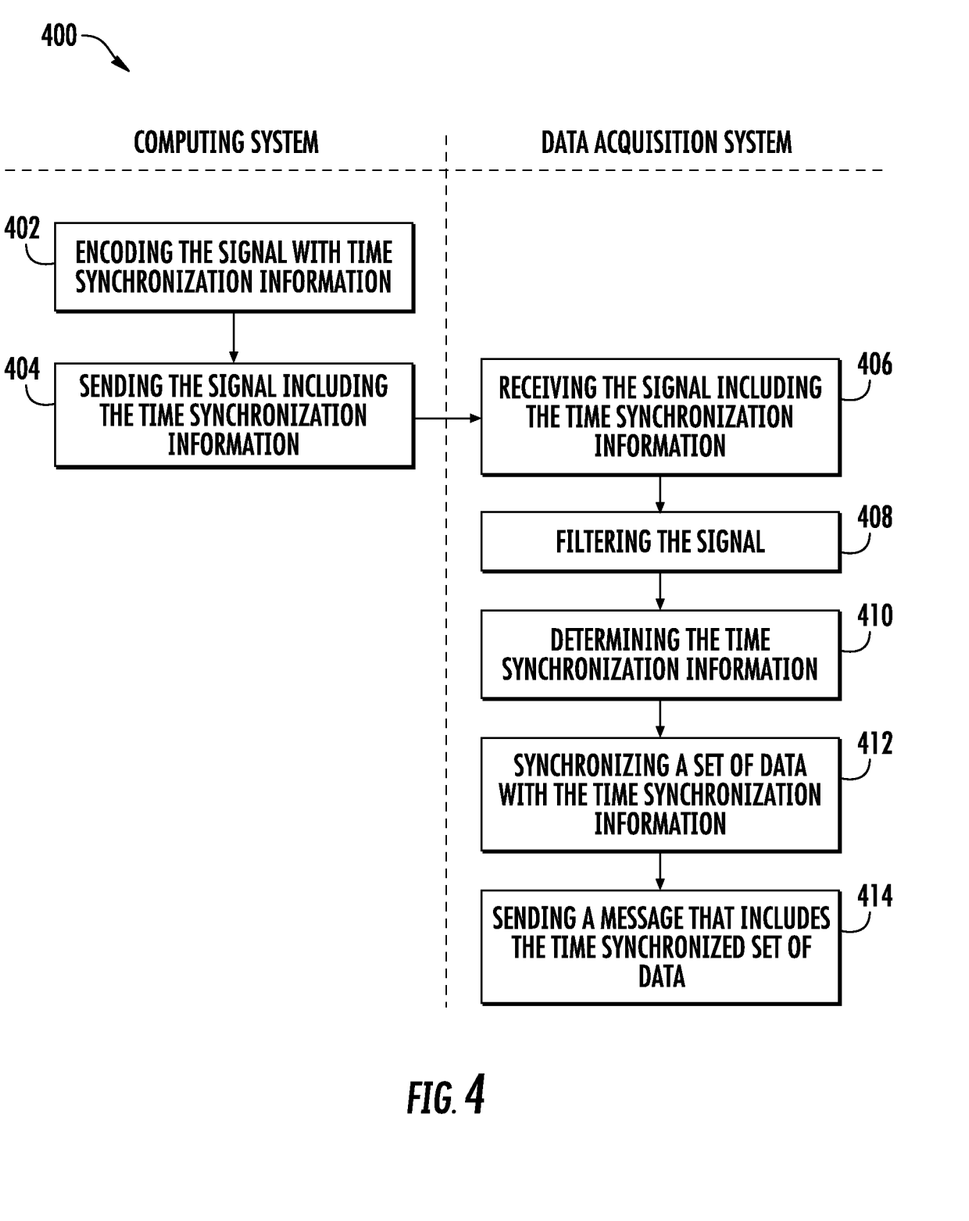
FIG. 4 depicts a flow diagram of an example method for providing time reference synchronization for an aircraft system according to examples of the present disclosure.

FIG. 4 depicts a flow diagram of example method 400 for providing time reference synchronization for an aircraft system according to example embodiments of the present disclosure. FIG. 4 can be implemented by one or more computing device(s), such as the computing device(s) 117 and 220. One or more step(s) of the method 400 can be performed while aircraft 110 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include encoding a signal with time synchronization information. For example, the computing device(s) 117 of computing system 116 can encode the signal 204 with time synchronization information 206. The signal 204 can include the first portion 310 and the second portion 320. In some implementations, the first signal portion 310 can include at least one of the preamble portion 312, the time reference portion 314, and the post-amble portion 316. The second signal portion 320 can include the time synchronization portion 322. Additionally, and/or alternatively, the signal 204 can include a carrier wave 302 (e.g., high frequency carrier wave) and can include one or more cycle(s) and/or pulse(s) (e.g., 317, 318, 319, 323) as described herein. In some implementations, at least one cycle and/or pulse can be amplitude shift keyed.

At (404) and (406), the method 400 can include sending and receiving the signal including the time synchronization information. For example, the computing device(s) 117 of computing system 116 can send (e.g., via one or more power line(s)) the signal 204 with the time synchronization information 206 to one or more data acquisition system(s) 119. The computing device(s) 220 of the data acquisition system(s) 119 can receive the signal 204 including the time synchronization information 206, as described above.

At (408), the method can include filtering the signal. For instance, the computing device(s) 220 of the data acquisition system(s) 119 can filter the signal 204 including the time synchronization information 206 to distinguish the first signal portion 310 and/or the second signal portion 320 from noise associated with the signal 204. The computing device(s) 220 of the data acquisition system(s) 119 can filter the signal 204 to eliminate any noise and/or interference other than the signal 204 at the carrier frequency.

At (410), the method can include determining the time synchronization information. For instance, the computing device(s) 220 of the data acquisition system(s) 119 can determine the time synchronization information 206 based, at least in part, on the first signal portion 310 and/or the second signal portion 320 of signal 204. To do so, in some implementations, the computing device(s) 220 can verify that the signal 204 includes the time synchronization information 206 and identify the time synchronization information 206 of the signal 204.

The computing device(s) 220 can verify the signal 204 based, at least in part, on the first portion 310. As described above, the first portion 310 can include at least one of a preamble portion 312, a time reference portion 314, and a post-amble portion 316. The computing device(s) 220 can verify the signal 204 based, at least in part, on at least one of the preamble portion 312, the time reference portion 314, and/or the post-amble portion 316.

In some implementations, the computing device(s) 220 can verify the signal 204 based, at least in part, on one or more threshold(s) 340. For example, the preamble portion 312 can include one or more first signal cycle(s) 317, the time reference portion 314 can include one or more second signal cycle(s) 318, and/or the post-amble portion 316 can include one or more third signal cycle(s) 319. The computing device(s) 220 can determine whether the first signal cycle(s) 317, the second signal cycle(s) 318, and/or the third signal cycle(s) 319 (e.g., their associated amplitudes) are above one or more threshold(s) 340. In some implementations, the one or more threshold(s) 340 can be indicative of whether the signal 204 includes the time synchronization information 206. For instance, the computing device(s) 220 can accept the signal 204 as including the time synchronization information 206 when the first signal cycle(s) 317, the second signal cycle(s) 318, and/or the third signal cycle(s) 319 are above the one or more threshold(s) 340. Such acceptance can indicate that the signal 204 does indeed include the time synchronization information 206, the signal 204 is not corrupt or error-ridden, etc. In this way, the computing device(s) 220 can verify that the signal 204 includes the time synchronization information 206 when the cycles of the first portion 310 are above the threshold(s) 340 and accordingly accept such a signal.

Additionally, and/or alternatively, the computing device(s) 220 can reject the signal 204 when at least one of the first signal cycle(s) 317, the second signal cycle(s) 318, and/or the third signal cycle(s) 319 are below the one or more threshold(s) 340. Such rejection can indicate an error and/or corruption of the signal 204 (e.g., associated with the first and/or second portions 310, 320) and/or the time synchronization information 206. In some implementations, a rejection can indicate that the signal 204 fails to include the time synchronization information 206.

The computing device(s) 220 of data acquisition system(s) 119 can also, and/or alternatively, identify and extract the time synchronization information 206 included in the signal 204. The computing device(s) 220 can identify the time synchronization information 206 based, at least in part, on the time synchronization portion 322. More specifically, in some implementations, the computing device(s) 220 can identify the time synchronization information 206 based, at least in part, on the one or more time synchronization pulse(s) 323.

By way of example, as shown in FIG. 3, the computing device(s) 220 can identify a local zero crossing 350 associated with one or more of the time synchronization pulse(s) 323 to determine a time 208. The local zero crossing 350 can be a point where one or more of the time synchronization pulse(s) 323 crosses a reference axis (e.g., the zero axis shown in FIG. 3). In some implementations, the computing device(s) 220 can identify the local zero crossing 350 based, at least in part, on an interpolation of two or more points associated with the local zero crossing 350. For instance, the two or more points can include a first point associated with the local zero crossing 350 that is above the reference axis (e.g., the zero axis shown in FIG. 3) and a second point associated with the local zero crossing 350 that is below the reference axis. The computing device(s) 220 can interpolate between the first point and the second point. The computing device(s) 117 can be configured to identify the time synchronization information 206 based, at least in part, on where the interpolation of the first and second points crosses the reference axis. Accordingly, the computing device(s) 220 can identify time synchronization information 206, including a time 208 associated therewith.

Returning to FIG. 4, at (412), the method can include synchronizing a set of data with the time synchronization information. For instance, the computing device(s) 220 of the data acquisition system(s) 119 can synchronize the set of data 230 acquired by the data acquisition system(s) 119 with the time 208. As described herein, the set of data 230 can be associated with a component 120 of the aircraft 110. The computing device(s) 220 can synchronize the set of data 230 with the time 208 (e.g., a local time).

At (414), the method can include sending a message that includes the time synchronized set of data. For instance, the computing device(s) 220 of the data acquisition system(s) 119 can send the message 240 comprising the set of data 230 (acquired by the data acquisition system(s) 119) synchronized with the time synchronization information 206. The message 240 can be sent to the remote computing system 250 that can be remote from the data acquisition system(s) 119 and/or the aircraft 110.

Figure 5:
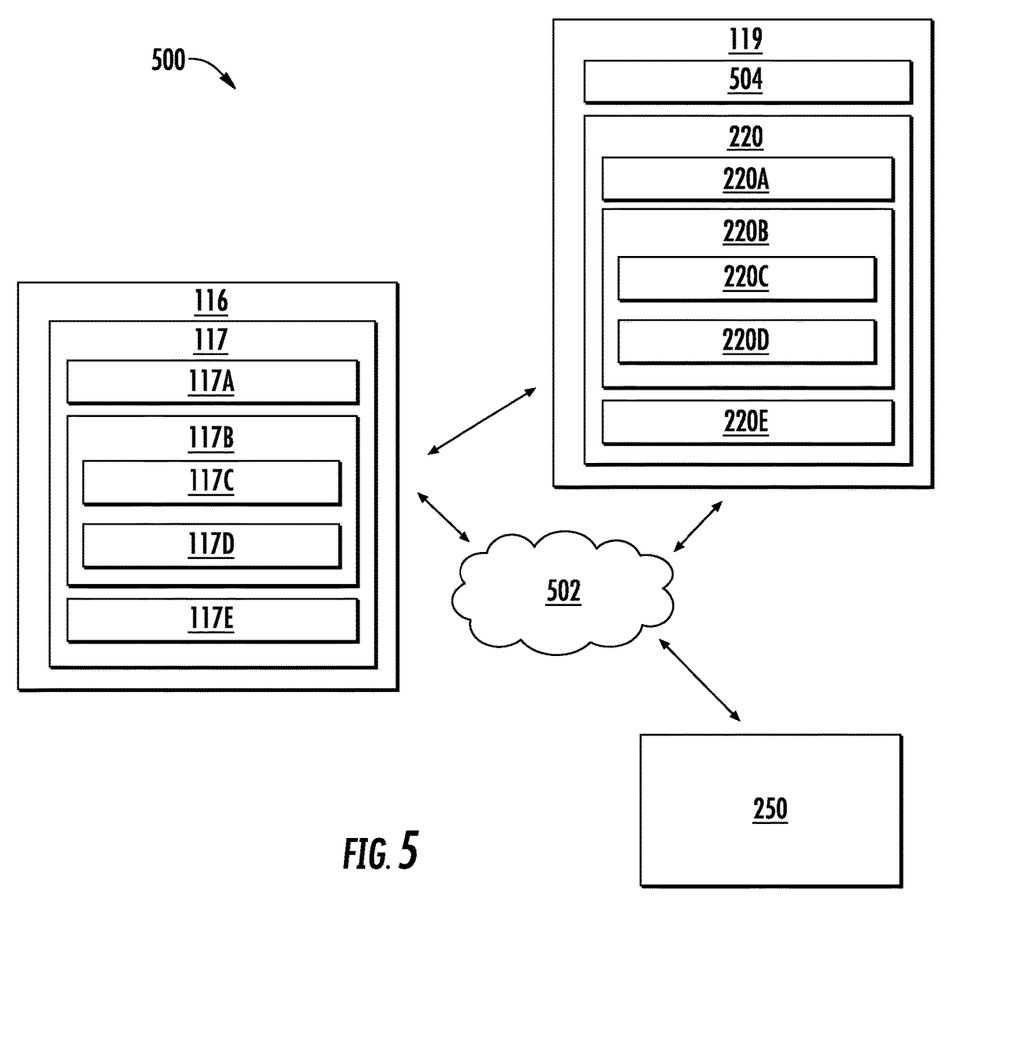
FIG. 5 depicts an example system according to examples of the present disclosure.

FIG. 5 depicts an example system 500 according to example embodiments of the present disclosure. The system 500 can include the computing system 116 and the data acquisition system(s) 119, which can be configured to communicate between one another, as described herein. In some implementations, the system 500 can include the remote computing system 250. The remote computing system 250 can be located onboard the aircraft 110. In some implementations, the remote computing system 250 can be associated with the computing system 116. In some implementations, the remote computing system 250 can be physically separated and remote from the data acquisition system(s) 119 and/or the computing system 116. For instance, the remote computing system 250 can be associated with a ground-based system for analyzing and collecting aircraft data. The computing system 116 and the data acquisition system(s) 119 can be configured to communicate with the remote computing system 250 via one or more communications network(s) 502. The communications network(s) 502 can include at least one of a SATCOM network, VHF network, a HF network, a Wi-Fi network, a WiMAX network, a gatelink network, and/or any other suitable communications network for transmitting messages to and/or from an aircraft.

The computing system 116 can include one or more computing device(s) 117. The computing device(s) 117 can include one or more processor(s) 117A and one or more memory device(s) 117B. The one or more processor(s) 117A can include any suitable processing device, such as a microprocessor, microcontroller, integrated circuit, logic device, and/or other suitable processing device. The one or more memory device(s) 117B can include one or more computer-readable media, including, but not limited to, non-transitory computer-readable media, RAM, ROM, hard drives, flash drives, and/or other memory devices.

The one or more memory device(s) 117B can store information accessible by the one or more processor(s) 117A, including computer-readable instructions 117C that can be executed by the one or more processor(s) 117A. The instructions 117C can be any set of instructions that when executed by the one or more processor(s) 117A, cause the one or more processor(s) 117A to perform operations. In some embodiments, the instructions 117C can be executed by the one or more processor(s) 117A to cause the one or more processor(s) 117A to perform operations, such as any of the operations and functions for which the computing system 116 and/or the computing device(s) 117 are configured, one or more operations for providing time reference synchronization for an aircraft system (e.g., method 700), as described herein, and/or any other operations or functions of the one or more computing device(s) 117. The instructions 117C can be software written in any suitable programming language or can be implemented in hardware. Additionally, and/or alternatively, the instructions 117C can be executed in logically and/or virtually separate threads on processor(s) 117A.

The memory device(s) 117B can further store data 117D that can be accessed by the processors 117A. For example, the data 117D can include data associated with the signal 204 (and/or any portions thereof), the time synchronization information 206, data associated with the data acquisition system(s) 119, and/or any other data and/or information described herein.

The computing device(s) 117 can also include a network interface 117E used to communicate, for example, with the other components of the system 500. The network interface 117E can include any suitable components for interfacing with one or more network(s), including for example, transmitters, receivers, ports, controllers, antennas, and/or other suitable components.

The data acquisition system(s) 119 can include one or more sensor(s) 504 and one or more computing device(s) 220. As described herein, the sensor(s) 504 (e.g., accelerometer, tachometer, magnetic tachometer, optical tachometer, and/or any other suitable type of measurement device) can be configured to acquire data associated with one or more component(s) of aircraft 110. The sensor(s) 504 can be associated with the computing device(s) 220. In some implementations, the sensor(s) 504 can be configured to perform one or more functions of the computing device(s) 220.

The computing device(s) 220 can include one or more processor(s) 220A and one or more memory device(s) 220B. The one or more processor(s) 220A can include any suitable processing device, such as a microprocessor, microcontroller, integrated circuit, logic device, and/or other suitable processing device. The one or more memory device(s) 220B can include one or more computer-readable media, including, but not limited to, non-transitory computer-readable media, RAM, ROM, hard drives, flash drives, and/or other memory devices.

The one or more memory device(s) 220B can store information accessible by the one or more processor(s) 220A, including computer-readable instructions 220C that can be executed by the one or more processor(s) 220A. The instructions 220C can be any set of instructions that when executed by the one or more processor(s) 220A, cause the one or more processor(s) 220A to perform operations. In some embodiments, the instructions 220C can be executed by the one or more processor(s) 220A to cause the one or more processor(s) 220A to perform operations, such as any of the operations and functions for which the data acquisition system(s) 119 and/or the computing device(s) 220 are configured, one or more operations for providing time reference synchronization for an aircraft system (e.g., method 700), as described herein, and/or any other operations or functions of the one or more computing device(s) 220. The instructions 220C can be software written in any suitable programming language or can be implemented in hardware. Additionally, and/or alternatively, the instructions 220C can be executed in logically and/or virtually separate threads on processor(s) 220A. The memory device(s) 220B can further store data 220D that can be accessed by the processors 220A. For example, the data 220D can include data associated with the signal 204 (and/or any portions thereof), the time synchronization information 206, the set of data 230, other data acquired and/or used by the data acquisition system(s) 119, and/or any other data and/or information described herein.

The computing device(s) 220 can also include a network interface 220E used to communicate, for example, with the other components of the system 500. The network interface 220E can include any suitable components for interfacing with one or more network(s), including for example, transmitters, receivers, ports, controllers, antennas, and/or other suitable components.

The circuitry configuration of the computing device(s) 117 and 220, shown in FIG. 5, is not intended to be limiting. For example, the computing device(s) 117 and/or 220 can include other processing circuitry and/or components to perform the functions described herein, than that shown in FIG. 5. The computing device(s) 117 and/or 220 can include more, less, and/or different components than shown.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What we claim is:

1. A computer-implemented method of providing time reference synchronization for an aircraft system, comprising:
   receiving, by one or more computing devices associated with a data acquisition system of an aircraft, a signal comprising time synchronization information, wherein the signal comprises a first signal portion and a second signal portion, wherein the first signal portion comprises a preamble portion, a time reference portion, and a post-amble portion and the second signal portion comprises a time synchronization portion, and wherein the preamble portion comprises one or more first signal cycles, the time reference portion comprises one or more second signal cycles, and the post-amble portion comprises one or more third signal cycles;
   filtering, by the one or more computing devices, the signal comprising the time synchronization information to distinguish the first signal portion and the second signal portion from noise associated with the signal;
   verifying, by the one or more computing devices, whether the signal is encoded with time synchronization information by determining whether the one or more first signal cycles, the one or more second signal cycles, and the one or more third signal cycles are above one or more thresholds, wherein the one or more thresholds are indicative of whether the signal comprises the time synchronization information;
   determining, by the one or more computing devices, the time synchronization information based at least in part on the first signal portion and the second signal portion; and
   synchronizing, by the one or more computing devices, a set of data acquired by the data acquisition system with the time synchronization information, wherein the signal comprises a high frequency carrier wave comprising one or more cycles, wherein at least one cycle is amplitude shift keyed.

2. The computer-implemented method of claim 1, wherein determining, by the one or more computing devices, the time synchronization information comprises:
   identifying, by the one or more computing devices, the time synchronization information based at least in part on the time synchronization portion.

3. The computer-implemented method of claim 1, further comprising:
   accepting, by the one or more computing devices, the signal comprising the time synchronization information when the one or more first signal cycles, the one or more second signal cycles, and the one or more third signal cycles are above the one or more thresholds.

4. The computer-implemented method of claim 1, wherein the time synchronization portion comprises one or more time synchronization pulses, and wherein determining, by the one or more computing devices, the time synchronization information comprises:
   identifying, by the one or more computing devices, the time synchronization information based at least in part on the one or more time synchronization pulses.

5. The computer-implemented method of claim 4, wherein identifying, by the one or more computing devices, the time synchronization information based at least in part on the one or more time synchronization pulses comprises:
   identifying, by the one or more computing devices, a local zero crossing associated with one or more of the time synchronization pulses to determine a time.

6. The computer-implemented method of claim 5, wherein synchronizing, by the one or more computing devices, the set of data acquired by the data acquisition system with the time synchronization information comprises:
   synchronizing, by the one or more computing devices, the set of data acquired by the data acquisition system with the time.

7. The computer-implemented method of claim 1, further comprising:
   sending, by the one or more computing devices, a message comprising the set of data acquired by the data acquisition system synchronized with the time synchronization information.

8. The computer-implemented method of claim 1, wherein receiving by the one or more computing devices associated with the data acquisition system of the aircraft, the signal comprises:
   receiving, by the one or more computing devices, the signal via one or more power lines associated with the data acquisition system.

9. A computing system for providing a time reference synchronization signal, the system comprising one or more processors and one or more memory devices included in an aircraft, the one or more memory devices storing instructions that when executed by the one or more processors cause the one or more processors to perform operations, the operations comprising:
   encoding a signal with time synchronization information in at least one of a preamble portion, a time reference portion, a post-amble portion, and a time synchronization portion, and wherein the preamble portion comprises one or more first signal cycles, the time reference portion comprises one or more second signal cycles, the post-amble portion comprises one or more third signal cycles, and the time synchronization portion comprises one or more time synchronization pulses; and
   sending the signal with the time synchronization information to one or more data acquisition systems, and
   wherein the data acquisition system is configured to verify that the signal is encoded with time synchronization information by determining whether the first signal cycles, the second signal cycles, and the third signal cycles are above one or more thresholds, wherein the one or more thresholds are indicative of whether the signal comprises the time synchronization information, and
   wherein the one or more data acquisition systems are configured to determine the time synchronization information based at least in part on at least one of the preamble portion, the time reference portion, the post-amble portion, and the time synchronization portion, wherein the signal comprises a high frequency carrier wave comprising one or more cycles, wherein at least one cycle is amplitude shift keyed.

10. The computing system of claim 9, wherein the one or more time synchronization pulses are encoded with a local time.

11. The computing system of claim 9, wherein sending the signal comprises:
modulating one or more power lines associated with the data acquisition systems with the signal comprising the high frequency carrier wave.

12. An aircraft comprising:
a computing system configured to
encode a signal with time synchronization information, wherein the signal comprises a first portion and a second portion, the first portion comprising a pre-amble portion, a time reference portion, and a post-amble portion, the second portion comprising a time synchronization portion, and wherein the preamble portion comprises one or more first signal cycles, the time reference portion comprises one or more second signal cycles, the post-amble portion comprises one or more third signal cycles, and the time synchronization portion comprises one or more time synchronization pulses, and
send the signal with the time synchronization information; and
a data acquisition system configured to
receive the signal comprising the time synchronization information,
verify that the signal is encoded with the time synchronization information based at least in part on at least one of the preamble portion, the time reference portion, and the post-amble portion, and wherein the data acquisition system is configured to verify that the signal is encoded with time synchronization information by determining whether the first signal cycles, the second signal cycles, and the third signal cycles are above one or more thresholds, wherein the one or more thresholds are indicative of whether the signal comprises the time synchronization information,
identify the time synchronization information based at least in part on the time synchronization portion, and
synchronize a set of data acquired by the data acquisition system with the time synchronization information, wherein the signal comprises a high frequency carrier wave comprising one or more cycles, wherein at least one cycle is amplitude shift keyed.

13. The aircraft of claim 12,
wherein the data acquisition system is configured to identify the time synchronization information based at least in part on the one or more time synchronization pulses.

14. The aircraft of claim 12, wherein the computing system is configured to send the signal via one or more power lines associated with the data acquisition system, and the data acquisition system is configured to receive the signal via the one or more power lines.

\* \* \* \* \*